United States Patent [19]

Cheng

[11] Patent Number: 4,685,288
[45] Date of Patent: Aug. 11, 1987

[54] APPARATUS FOR REMOVING NONCONDENSABLE GASES FROM COGENERATED PROCESS STEAM IN DUAL FLUID CHENG CYCLE ENGINES

[75] Inventor: Dah Y. Cheng, Los Altos, Calif.
[73] Assignee: International Power Technology, Palo Alto, Calif.
[21] Appl. No.: 933,101
[22] Filed: Nov. 20, 1986

Related U.S. Application Data

[63] Continuation of Ser. No. 715,091, Mar. 22, 1985, abandoned.

[51] Int. Cl.⁴ .................................................. F02C 6/18
[52] U.S. Cl. .................................... 60/39.55; 122/7 R
[58] Field of Search ............... 60/39.05, 39.07, 39.182, 60/39.53, 39.55; 122/2 R

[56] References Cited

U.S. PATENT DOCUMENTS 3,353,360 11/1967 Gorzengno ...................... 60/39.182
3,461,667 8/1969 Aguet ................................. 60/39.05

Primary Examiner—Louis J. Casaregola
Attorney, Agent, or Firm—Limbach, Limbach & Sutton

[57] ABSTRACT

An apparatus which automatically removes the noncondensable gases from the process steam cogenerated in the Cheng cycle system.

1 Claim, 2 Drawing Figures

APPARATUS FOR REMOVING NONCONDENSABLE GASES FROM COGENERATED PROCESS STEAM IN DUAL FLUID CHENG CYCLE ENGINES

This is a continuation of application Ser. No. 715,091, filed Mar. 22, 1985, (abandoned).

DESCRIPTION

Technical Field

This invention relates generally to an apparatus for removing noncondensable gases from process steam, and more particularly to process steam cogenerated in a dual fluid Cheng cycle engine.

BACKGROUND OF THE INVENTION

The dual fluid heat engine has been described in U.S. Pat. Nos. 3,978,661, 4,128,994 and 4,248,039. Parameter optimization and control paths for the dual fluid heat engine are described in U.S. Pat. Nos. 4,297,841, 4,417,438 and 4,393,649. This invention relates to an apparatus for the removal of noncondensable gases from process steam cogenerated during operation of the Cheng cycle engine.

REMOVAL OF NONCONDENSABLE GASES FROM PROCESS STEAM

Conventional boiler systems are typically closed-loop systems. Little make-up water has to be added because the water is cycled through the evaporation and condensation steps without significant loss of mass. The closed-loop nature of these boilers results in the accumulation of impurities in the process water. These impurities, solid or gaseous, have two distinct effects on the boiler system. For noncondensable (at operating conditions of temperature and pressure in a boiler system) and noncorrosive gases, e.g., nitrogen, the accumulation of impurities reduces the heat exchange coefficient of the heat exchanges in the boiler set. Noncondensable and corrosive gases, e.g., oxygen and carbon dioxide, attack the metal boiler components as well as alter the thermodynamic characteristics of the system.

The dual fluid engine utilizing the Cheng cycle is not a closed-loop system; it requires a noncondensable fluid as the second thermodynamic working fluid. Noncondensable gases are not accumulated in the engine because they are vented to the atmosphere. However, cogenerated process steam produced in a dual fluid engine utilizing the Cheng cycle must typically be free from noncondensable gases and other impurities because the cogenerated steam consumer has the same concerns relating to reduced heat transfer coefficients and corrosion of metal parts as the operator of a conventional boiler system.

Thus, the introduction of noncondensable gases to the boiler section of the dual fluid engine is not completely free from problems. When process steam is required, it is removed from the water storage drum. It has been previously recognized in the steam generation industry that non-condensable gases, most often less dense than steam, will accumulate at the top of elbows or bends in process steam piping. Non-condensable gases are then manually vented from these process steam lines by opening valves located in these high points and by letting fluid escape from such lines until only steam is flowing out of such valves. This manual method relies on visual means to determine when all of the non-condensable gases have been vented. This manual venting procedure also requires a large amount of operator time and attention. The operators must leave the control room and manually attend to each valve. Only after the non-condensable gases have been vented from the process steam can it be safely delivered for distribution to the ultimate users.

Since the Cheng cycle cogeneration system has a specific utility for non-condensable gases mixed with steam in the steam-injected gas turbine, an automatic venting of non-condensable gases from process steam was conceived. The subject invention relates to an apparatus for the automatic removal of such non-condensable gases, from process steam. This apparatus takes advantage of the pressure differential which occurs between the process steam line, which is in equilibrium with the water storage drum, and the steam injection line which is at a reduced pressure due to the high velocity flow of superheated steam toward the combustion chamber and steam injected gas turbine. By joining these two lines with a small diameter tube, the flow to the steam injection line. This apparatus has many advantages over the previously described manual method; in particular, it saves a great deal of time and mimimizes costly energy losses resulting from the atmospheric venting of large amounts of high quality steam.

It is therefore an object of the invention to provide an apparatus for the automatic removal of non-condensable gases from process steam;

It is a further object of the invention to provide an apparatus which is safe and energy efficient in operation;

It is an object of the invention to provide an apparatus which is less time consuming to use and which requires less operator attention;

It is yet another objective of the invention to provide an apparatus for removing non-condensable gases from process steam prior to distribution which does not interfere with the process control systems which regulate steam injection into the combustion chamber or process steam distribution.

SUMMARY OF THE INVENTION

In accordance with this invention as it relates to the Cheng cycle, the noncondensable gases introduced to the water during cold start-up are automatically removed from the water storage drum and process steam lines. Simply, the process steam line is joined to the steam injection line by a small diameter tube. A pressure differential causes the noncondensable gases accumulated in the process steam line to flow to the steam injection line. A small diameter tube is used to prevent a large steam massflow across the pressure gradient. A large massflow could interfere with the steam injector valve control system or the process steam control system.

DESCRIPTION OF THE PREFERRED EMBODIMENTS

Figure 1:
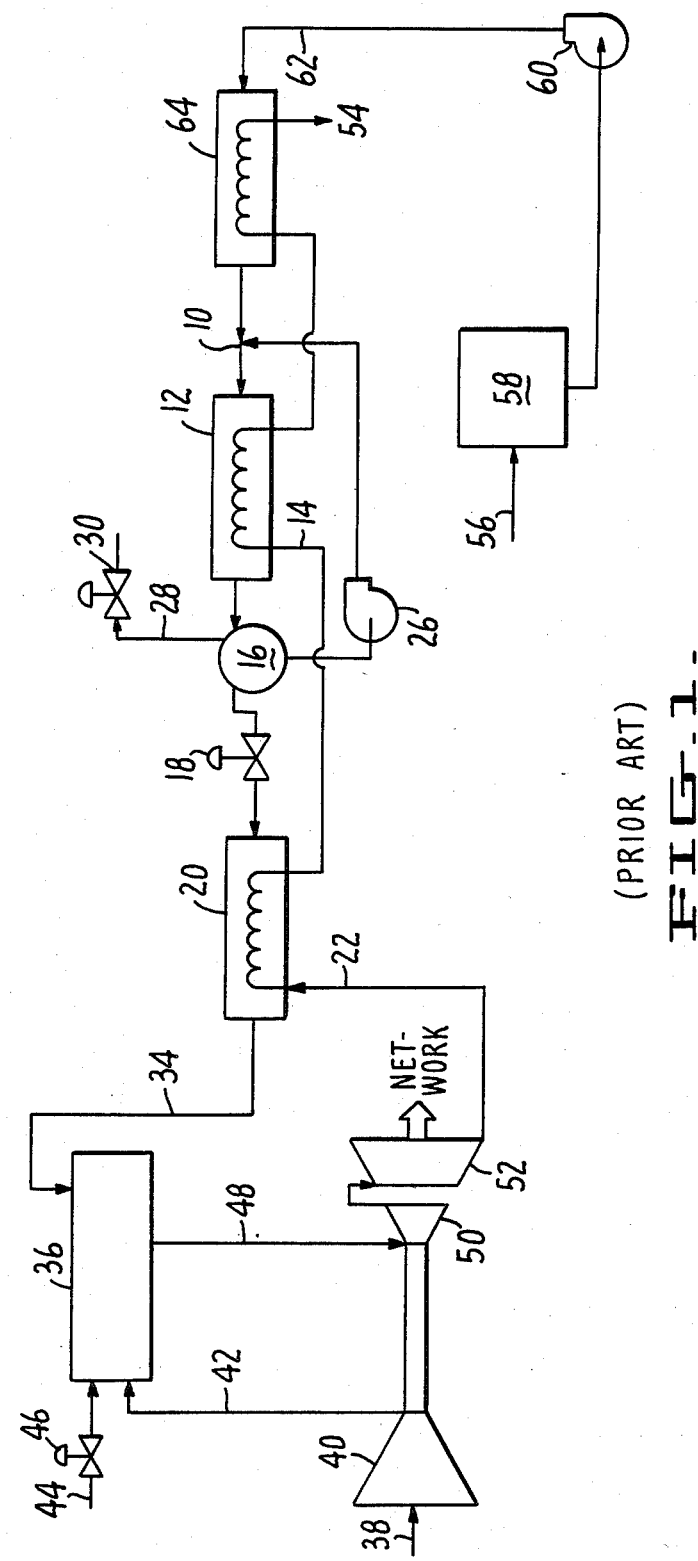
FIG. 1 is a block diagram of one embodiment of the Cheng cycle system.
Figure 2:
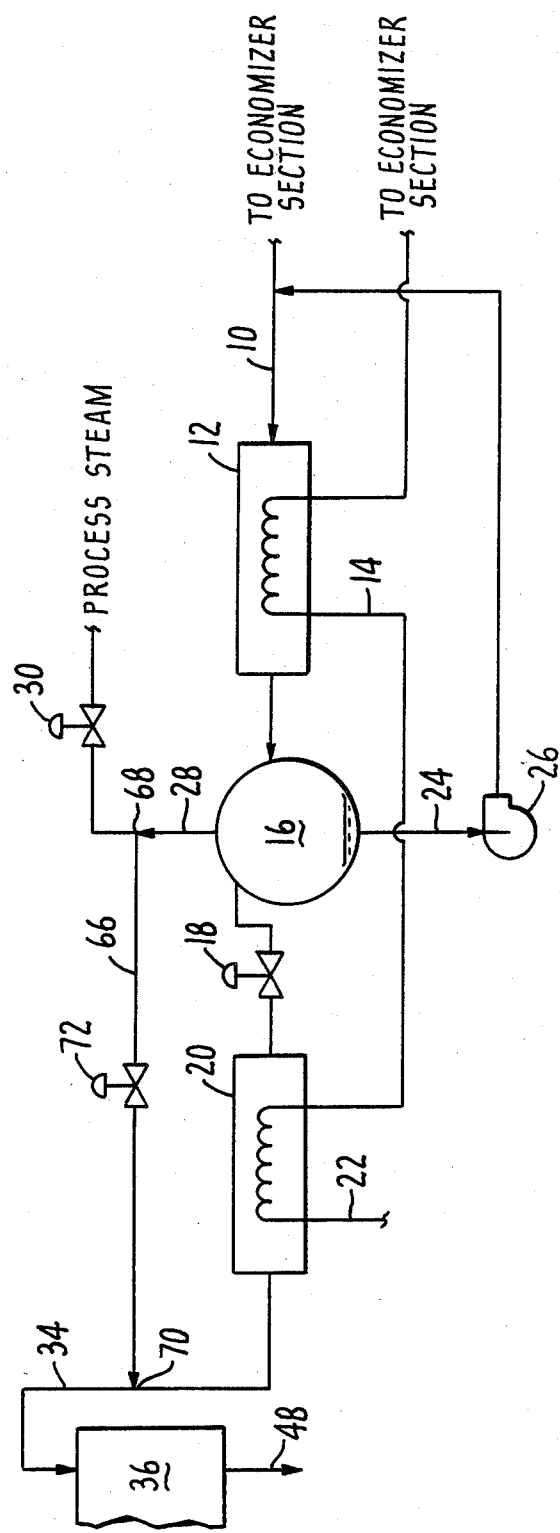
FIG. 2 is a detailed diagram of the superheater section, water storage drum and evaporator section of one embodiment of the Cheng cycle system.

Noncondensable gases are introduced into the steam side of the counterflow heat exchanger during the start-up procedure. Although these gases do not pose the same problems as in a steam turbine engine, the gases must still be eliminated from the process steam cogenerated in the Cheng cycle system because the process steam customers do encounter the corrosion and heat transfer difficulties previously discussed. Often these noncondensable gases are trapped in the process steam line 28 on the upstream side of process steam control valve 30 in FIG. 1. The new and improved apparatus for removing the noncondensable gases from the process steam cogenerated in the Cheng cycle system is shown in FIG. 2. Water storage drum 16 is located between, and connected to, the superheater 20 and the evaporator 12. Process steam is withdrawn from the water storage drum 16 through the process steam line 28, passing through the process steam control valve 30 before entering the process steam distribution piping. Before the process steam control valve 30 can be opened to distribute the process steam to its consumers, the noncondensable gases must be removed from the process steam line 28.

In this preferred embodiment of the invention a small diameter tube known as the automatic vent 66 joins the process steam line 28 to the steam injection line 34. A small hand controlled valve, the vent valve 72, is placed in the automatic vent 66.

The noncondensable gases are removed from the process steam in the process steam line 28 when the vent valve 72 is left open. The noncondensable gases flow through the automatic vent 66 as a result of a pressure differential. When the process steam control valve 30 is closed, the pressure at the process steam line-vent T-connection 68 exceeds the pressure at the steam injection line-vent T-connection 70 because of the high velocity flow of steam past the T-connection 70 to the combustion chamber 36. Connecting the process steam line 28 and the steam injection line 34 with a small diameter tube 66 does not significantly upset the process control systems for either stream. The pressure differential across the automatic vent 66 is not so great as to result in high velocity or high mass flow through the automatic vent 66 which could interfere with the characteristic fluid flow in either the steam injection line 34 or the process steam line 28.

Since there is no vent to the atmosphere, this apparatus eliminates wasteful venting procedures which exhaust high quality steam to the atmosphere.

Obviously, other modifications and variations of the present invention are possible in light of the above teachings. It is therefore to be understood that changes may be made in the particular embodiments described herein which are within the scope of the appended claims.

I claim:

1. An apparatus for removing noncondensable gases from process steam cogenerated in a steam-injected gas turbine engine said engine comprising:
    (a) a chamber;
    (b) compressor means for introducing air into said chamber;
    (c) means for introducing steam within said chamber, said steam introducing means including an automatically controlled steam injector valve and steam injection line,
    (d) means for heating said air and steam in said chamber, including means for combustion;
    (e) turbine means responsive to a mixture of air, combustion products and steam for converting the energy associated with the mixture to mechanical energy;
    (f) counterflow heat exchanger means, including at least superheater and evaporator sections, for transferring residual thermal energy from a mixture of air, combustion products and steam exhausted from said turbine means to incoming water and steam, wherein said evaporator section includes a water storage drum, a process steam line, a venting location in said process steam line, and a cogeneration valve which allows high pressure steam to be withdrawn from said water storage drum to supply process steam, and wherein the apparatus for removing noncondensable gases comprises:

a small diameter tube, joined at one end to the process steam line venting location and joined at the other end to the steam injection line which is part of said steam introducing means, whereby non-condensable gases are permitted to flow through the tube from the venting location to the steam injection line without interfering with the operation of the automatic steam injection control valve.

* * * * *